US012792051B2

(12) United States Patent
Kamitani

(10) Patent No.: US 12,792,051 B2
(45) Date of Patent: Nov. 10, 2026

(54) POSITION DETERMINATION APPARATUS, POSITION DETERMINATION METHOD, AND NON-TRANSITORY COMPUTER-READABLE MEDIUM

(71) Applicant: NEC Corporation, Tokyo (JP)

(72) Inventor: Yusuke Kamitani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 322 days.

(21) Appl. No.: 18/278,095

(22) PCT Filed: Dec. 1, 2021

(86) PCT No.: PCT/JP2021/044093

§ 371 (c)(1),
(2) Date: Aug. 21, 2023

(87) PCT Pub. No.: WO2022/180975

PCT Pub. Date: Sep. 1, 2022

(65) Prior Publication Data

US 2024/0126295 A1 Apr. 18, 2024

(30) Foreign Application Priority Data

Feb. 24, 2021 (JP) ................................ 2021-027553

(51) Int. Cl.
*G05D 1/46* (2024.01)
*G01C 21/20* (2006.01)
*B64U 101/30* (2023.01)

(52) U.S. Cl.
CPC ............... *G05D 1/46* (2024.01); *G01C 21/20* (2013.01); *B64U 2101/30* (2023.01)

(58) Field of Classification Search
CPC .. G05D 1/46; G05D 2111/10; G05D 2111/17; G05D 2111/52; G05D 1/242;
(Continued)

(56) References Cited

U.S. PATENT DOCUMENTS 10,502,584 B1 * 12/2019 Suiter ...................... G08G 5/74

FOREIGN PATENT DOCUMENTS

CN 109917799 A 6/2019
CN 110268354 A * 9/2019 ......... G01C 21/3804
(Continued)

OTHER PUBLICATIONS

CN110268354 english translation (Year: 2025).*
(Continued)

*Primary Examiner* — Ramon A. Mercado
*Assistant Examiner* — Paul A Castro
(74) *Attorney, Agent, or Firm* — Sughrue Mion, PLLC

(57) ABSTRACT

A control unit (150) of a flying body includes a reference information acquisition unit (151), a surrounding information acquisition unit (152), and a position determination unit (153). The reference information acquisition unit (151) acquires reference map information being three-dimensional map information of an area in which a flying body is to be flown. The surrounding information acquisition unit (152) acquires surrounding information indicating a three-dimensional shape around the flying body. The surrounding information is generated by, for example, a sensor mounted on the flying body. The position determination unit (153) determines a three-dimensional position of the flying body in the reference map information by using the reference map information and the surrounding information.

14 Claims, 10 Drawing Sheets

(58) Field of Classification Search
CPC ...... G05D 1/243; G05D 1/2465; G05D 1/689; G05D 2105/89; G05D 2107/90; G05D 2109/254; G01C 21/20; G01C 21/1652; G01C 23/00; B64U 2101/30; G01B 11/24; G08G 5/00
See application file for complete search history.

(56) References Cited

FOREIGN PATENT DOCUMENTS

| | | | | | |
|---|---|---|---|---|---|
| CN | 112173103 | A | * | 1/2021 | ............. B64U 50/19 |
| CN | 112306077 | A | | 2/2021 | |
| JP | 2005-233714 | A | | 9/2005 | |
| JP | 2018-160228 | A | | 10/2018 | |
| JP | 2018-180359 | A | | 11/2018 | |
| JP | 2019-009919 | A | | 1/2019 | |
| JP | 2020197467 | A | * | 12/2020 | |

OTHER PUBLICATIONS

CN_112173103 English Translation (Year: 2025).*
JP 2020197467 translate (Year: 2026).*
International Search Report for PCT Application No. PCT/JP2021/044093, mailed on Feb. 22, 2022.
JP Notice of Termination of Reconsideration for JP Application No. 2023-502080, issued on Sep. 30, 2025 with English Translation.
JP Reconsideration Report for JP Application No. 2023-502080, on Sep. 22, 2025 with English Translation.

* cited by examiner

POSITION DETERMINATION APPARATUS, POSITION DETERMINATION METHOD, AND NON-TRANSITORY COMPUTER-READABLE MEDIUM

This application is a National Stage Entry of PCT/JP2021/044093 filed on Dec. 1, 2021, which claims priority from JP Patent Application 2021-027553 filed on Feb. 24, 2021, the contents of all of which are incorporated herein by reference, in their entirety.

TECHNICAL FIELD

The present invention relates to a position determination apparatus, an information processing apparatus, a position determination method, an information processing method, and a program.

BACKGROUND ART

In recent years, it has been considered that a measurement target such as a bridge is measured by using a flying body such as a drone. At this time, it is important to recognize a position of the flying body.

For example, Patent Document 1 discloses the following. First, ground three-dimensional coordinate information of a structure to be inspected is prepared. Next, a drone having a simultaneous localization and mapping (SLAM) function is made to fly, and the drone is made to capture, as a video, a landscape image of the ground. At this time, the drone generates self-position information and map information. Then, the generated map information is superimposed on the ground three-dimensional coordinate information. Thereby, an association relation between coordinates used in the drone and coordinates used in the ground three-dimensional coordinate information is determined.

RELATED DOCUMENT

Patent Document

Patent Document 1: Japanese Patent Application Publication No. 2020-197467

SUMMARY OF INVENTION

Technical Problem

It is important to determine a position of a flying body with high accuracy. In one example, in a case such as one of measuring aged deterioration of a measurement target, a flying body is sometimes made to fly accurately on the same route a plurality of times. In this case, when accuracy of a position of the flying body declines, it becomes difficult to make the flying body fly on the same route. One example of an object of the present invention is to determine a position of a flying body with high accuracy.

Solution to Problem

According to the present invention, there is provided a position determination apparatus including:

a reference information acquisition unit that acquires reference map information being three-dimensional map information of an area in which a flying body is to be flown;

a surrounding information acquisition unit that acquires surrounding information indicating a three-dimensional shape around the flying body; and a position determination unit that determines a three-dimensional position of the flying body in the reference map information by using the reference map information and the surrounding information.

According to the present invention, there is provided an information processing apparatus used together with the above-described position determination apparatus, wherein, in the above-described position determination apparatus, the flying body includes a sensor including at least one of an image capturing unit and a LiDAR, and the area includes a measurement target to be measured by the sensor, the information processing apparatus including:

a measurement data acquisition unit that acquires, from the position determination apparatus, a position of the flying body in the reference map information and measurement data of the sensor; and a data processing unit that determines, by using a position of the flying body, the measurement data at the position, and the reference map information, an unmeasured part in the measurement target that has not been measured by the sensor, and outputs information indicating the unmeasured part.

According to the present invention, there is provided a position determination method performed by a computer, the position determination method including:

reference information acquisition processing of acquiring reference map information being three-dimensional map information of an area in which a flying body is to be flown;

surrounding information acquisition processing of acquiring surrounding information indicating a three-dimensional shape around the flying body; and position determination processing of determining a three-dimensional position of the flying body in the reference map information by using the reference map information and the surrounding information.

According to the present invention, there is provided an information processing method performed by a computer used together with the above-described position determination apparatus, wherein the flying body includes a sensor including at least one of an image capturing unit and a LiDAR, and the area includes a measurement target to be measured by the sensor, the information processing method including, measurement data acquisition processing of acquiring, from the position determination apparatus, a position of the flying body in the reference map information and measurement data of the sensor; and data processing of using a position of the flying body and the measurement data at the position, and the reference map information, thereby determining an unmeasured part in the measurement target that has not been measured by the sensor, and outputting information indicating the unmeasured part.

According to the present invention, there is provided a program causing a computer to include:

a reference information acquisition function of acquiring reference map information being three-dimensional map information of an area in which a flying body is to be flown;

a surrounding information acquisition function of acquiring surrounding information indicating a three-dimensional shape around the flying body; and a position determination function of determining a three-dimensional position of the flying body in the reference map information by using the reference map information and the surrounding information.

According to the present invention, there is provided a program executed by a computer used together with the above-described position determination apparatus, wherein the flying body includes a sensor including at least one of an image capturing unit and a LiDAR, the area includes a measurement target to be measured by the sensor, the program causing the computer to include:

a measurement data acquisition function of acquiring, from the position determination apparatus, a position of the flying body in the reference map information and measurement data of the sensor; and a data function of using a position of the flying body and the measurement data at the position, and the reference map information, thereby determining an unmeasured part in the measurement target that has not been measured by the sensor, and outputting information indicating the unmeasured part.

Advantageous Effects of Invention

According to the present invention, a position of a flying body can be determined with high accuracy.

DESCRIPTION OF EMBODIMENTS

Hereinafter, an example embodiment of the present invention will be described with reference to the drawings. Note that, in all the drawings, a similar constituent element is denoted by a similar reference sign, and description thereof will be appropriately omitted.

Figure 1:
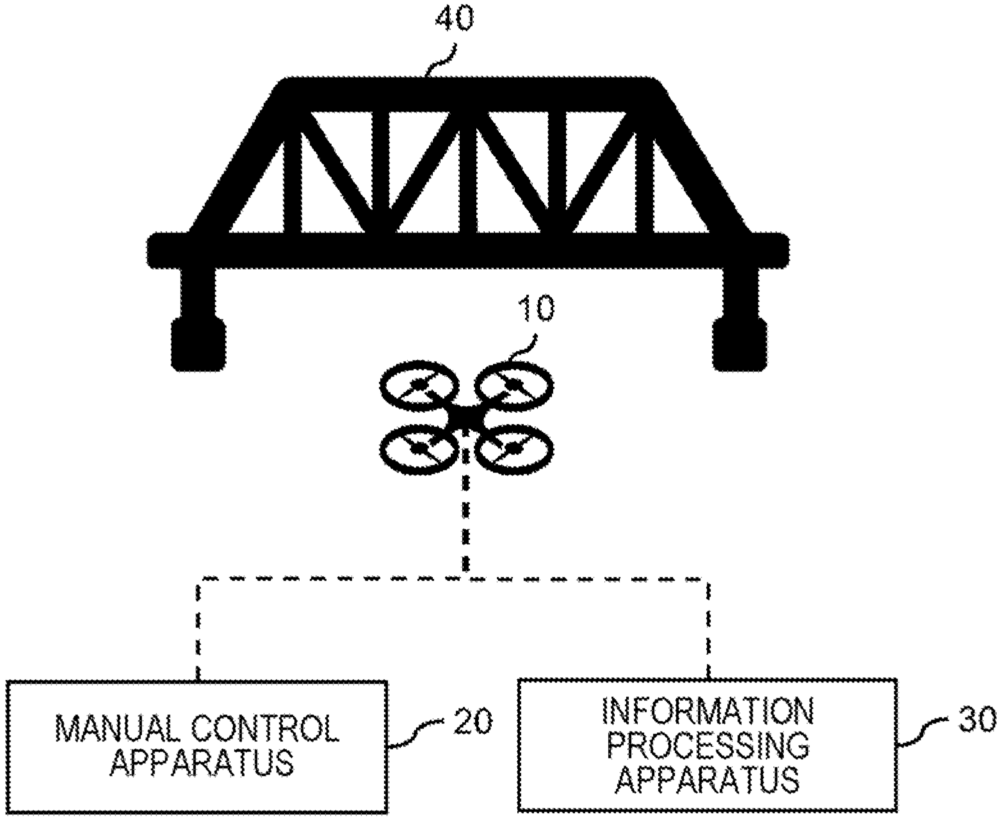
FIG. 1 It is a diagram for illustrating an entire formation of a measurement system according to an example embodiment.

FIG. 1 is a diagram for illustrating an entire formation of a measurement system according to an example embodiment. This measurement system includes a flying body 10 and an information processing apparatus 30, and is used at a time of measuring a measurement target 40. The measurement target 40 is, for example, a structure such as a bridge, a dam, a building, and a tunnel. Then, the flying body 10 flies, for example, in order to detect a deteriorated portion in the measurement target 40 or periodically observe the portion.

The flying body 10 is, for example, an unmanned aerial vehicle (UAV) such as a drone, includes a sensor, and flies around the measurement target 40. At this time, the sensor of the flying body 10 measures the measurement target 40. Data (hereinafter, referred to as measurement data) generated by this sensor are transmitted to the information processing apparatus 30, together with data (hereinafter, referred to as position data) indicating a position and a pose of the flying body 10 in a three-dimensional space when the measurement data are generated.

The information processing apparatus 30 processes the measurement data, and also stores the measurement data and the position data in association with each other. In addition, the information processing apparatus 30 stores information (hereinafter, referred to as route information) indicating a route on which the flying body 10 is to be flown when measuring the measurement target 40. Position information used in this route information is based on a three-dimensional map information (hereinafter, referred to as reference map information) of an area in which the flying body 10 is to be flown. The reference map information includes coordinates of at least each part of the measurement target 40, in the three-dimensional space. Then, the information processing apparatus 30 transmits the reference map information and the route information to the flying body 10.

The flying body 10 flies autonomously according to the route information acquired from the information processing apparatus 30. At this time, the flying body 10 uses the reference map information. Note that, the flying body 10 may be controlled by a manual control apparatus 20. The manual control apparatus is operated by an operator of the flying body 10, and transmits a control signal to the flying body 10.

Figure 2:
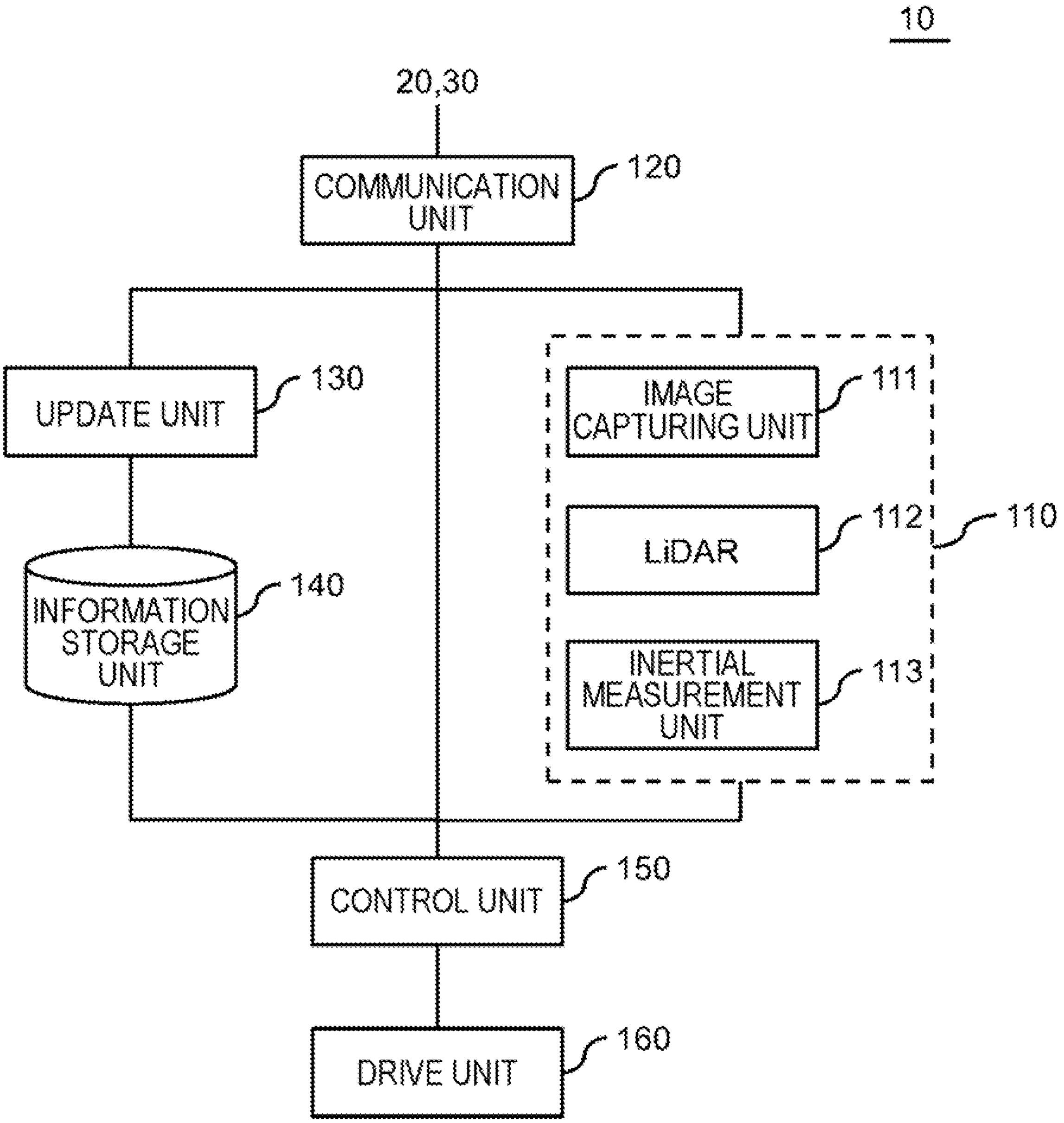
FIG. 2 It is a diagram illustrating one example of a functional configuration of a flying body.

FIG. 2 is a diagram illustrating one example of a functional configuration of the flying body 10. The flying body 10 includes a sensor 110, a communication unit 120, an update unit 130, an information storage unit 140, a control unit 150, and a drive unit 160.

The sensor 110 measures surroundings of the flying body 10. When the flying body 10 flies around the measurement target 40, an area to be measured by the sensor 110 includes the measurement target 40. In the example illustrated in the present drawing, the flying body 10 includes an image capturing unit 111, a light detection and ranging (LiDAR) 112, and an inertial measurement unit 113.

The image capturing unit 111 captures an image of surroundings of the flying body 10, and thereby generates image data. A frame rate of the image data generated by the image capturing unit 111 is equal to or more than five frames/second, for example, but may be less than this.

The LiDAR 112 generates three-dimensional point group information around the flying body 10 by detecting reflected light of laser light while scanning the laser light. This three-dimensional point group information indicates, for each irradiation direction of the laser, a distance from a point that reflects the laser light to the flying body 10.

The inertial measurement unit 113 detects inertial motion of the flying body 10 in the three-dimensional space. Specifically, the inertial measurement unit 113 includes an acceleration sensor, a gyro sensor, and a magnetic sensor. The acceleration sensor detects acceleration of the flying body 10 in three axis directions orthogonal to one another, the gyro sensor detects angular acceleration of the flying body 10 in a rotational direction around each of three axes, and the magnetic sensor detects a magnetic moment in each of the three axis directions. However, no magnetic sensor may be provided.

The communication unit 120 transmits, to the information processing apparatus 30, measurement data generated by the sensor 110. When the flying body 10 is controlled by the manual control apparatus 20, the communication unit 120 transmits the measurement data also to the manual control apparatus 20. The measurement data to be transmitted herein includes image data generated by the image capturing unit 111 and point group data generated by the LiDAR 112. Note that, the measurement data to be transmitted may further include data generated by the inertial measurement unit 113.

In addition, the communication unit 120 acquires, from the information processing apparatus 30, the above-described route information and reference map information. The update unit 130 causes the route information and the reference map information to be stored in the information storage unit 140.

The control unit 150 controls the drive unit 160 by using the measurement data generated by the sensor 110, and thereby moves the flying body 10 according to the route information. Note that, the drive unit 160 includes a mechanism for causing the flying body 10 to fly, for example, a rotor of the flying body 10 and a motor that rotates the rotor.

Figure 3:
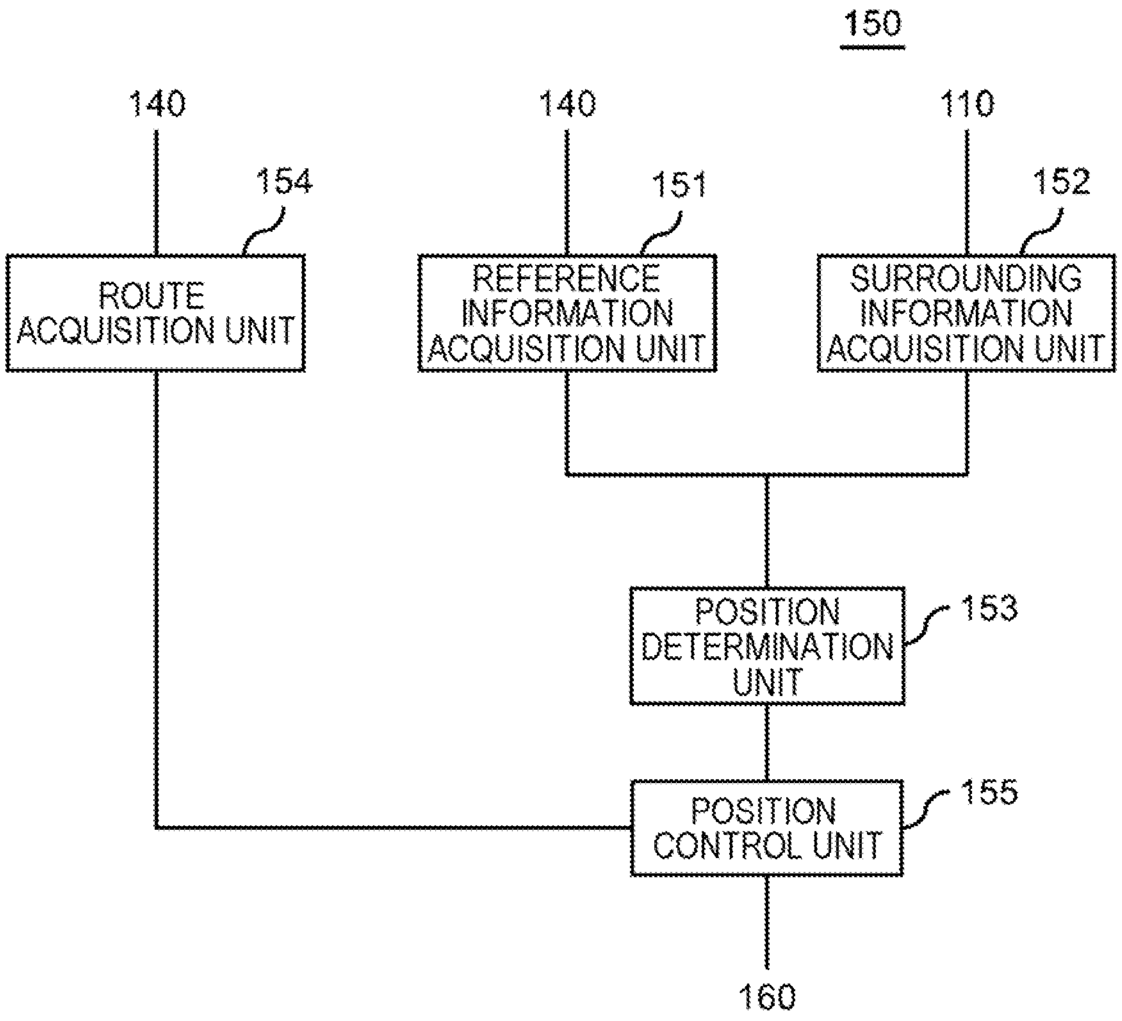
FIG. 3 It is a diagram illustrating a detailed example of functions of a control unit.

FIG. 3 is a diagram illustrating a detailed example of functions of the control unit 150. In the example illustrated in the present drawing, the control unit 150 includes a reference information acquisition unit 151, a surrounding information acquisition unit 152, a position determination unit 153, a route acquisition unit 154, and a position control unit 155.

The reference information acquisition unit 151 acquires the reference map information from the information storage unit 140.

The surrounding information acquisition unit 152 processes the measurement data generated by the sensor 110, and thereby generate information (hereinafter, referred to as surrounding information) indicating a three-dimensional shape of surroundings of the flying body 10. The surrounding information acquisition unit 152 generates the surrounding information by using a SLAM function, for example.

The position determination unit 153 uses the reference map information and the surrounding information, and thereby generates data, i.e., the above-described position data, indicating a position and a pose of the flying body in a coordinate system indicated by the reference map information. For example, the control unit 150 uses the reference map information, and can thereby compute what three-dimensional shape is acquired when viewing from which point in which direction in the coordinate system of the reference map information. In this regard, the control unit 150 determines, as a position and a pose of the flying body 10, a point at which a three-dimensional shape closest to a three-dimensional shape indicated by the surrounding information is acquired. Then, the control unit 150 sets, as position data, data indicating this point in the coordinate system of the reference map information and data indicating a pose of the flying body 10. The position data are transmitted to the information processing apparatus 30 via the communication unit 120. At this time, the communication unit 120 transmits the position data in a state of being associated with measurement data generated by the sensor 110 at that position.

Note that, at a time of determining this point, the position determination unit 153 may narrow down, as a candidate for this point, surroundings of a position indicated by the position data generated immediately before. Thereby, an amount of computation performed by the position determination unit 153 is reduced.

The route acquisition unit 154 reads out the route information from the information storage unit 140.

The position control unit 155 controls the drive unit 160 in such a way that position data generated by the position determination unit 153 move along a route indicated by the route information.

Note that, the flying body 10 flies in order to measure the measurement target 40. Thus, the flying body 10 needs to control a pose thereof (e.g., orientation) in such a way that a measurement range of the sensor includes the measurement target 40. In this regard, the route information includes information (hereinafter, referred to as pose information) indicating a pose to be taken by the flying body 10, for each position on the route. The pose information is generated by using the coordinate system of the reference map information. Then, the position control unit 155 of the flying body 10 controls a pose of the flying body 10 in such a way as to become a pose indicated by the pose information.

Figure 4:
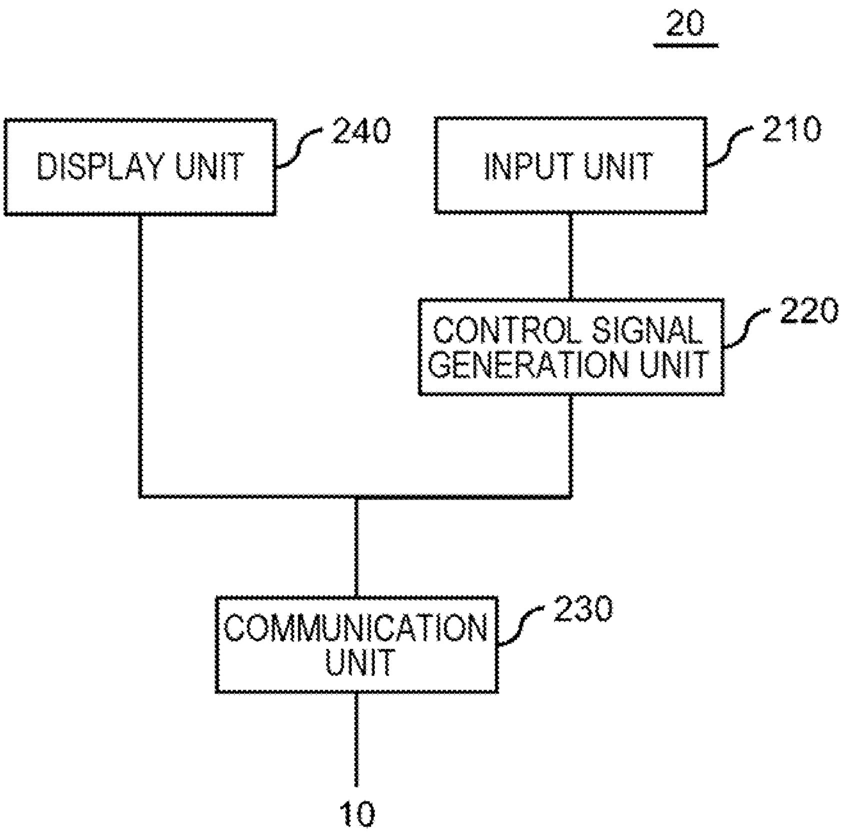
FIG. 4 It is a diagram illustrating one example of a functional configuration of a manual control apparatus.

FIG. 4 is a diagram illustrating one example of a functional configuration of the manual control apparatus 20. In the example illustrated in the present drawing, the manual control apparatus 20 includes an input unit 210, a control signal generation unit 220, a communication unit 230, and a display unit 240.

The input unit 210 includes an input device operated by an operator of the flying body 10, and generates a signal indicating a content of operation on this input device.

The control signal generation unit 220 generates a control signal for controlling the drive unit 160 of the flying body 10, according to the signal generated by the input unit 210. This control signal is transmitted to the flying body 10 by the communication unit 230. In this case, the control unit 150 of the flying body 10 controls the drive unit 160 according to this control signal.

In addition, the communication unit 230 acquires image data generated by the image capturing unit 111 of the flying body 10. The display unit 240 displays the image data.

Figure 5:
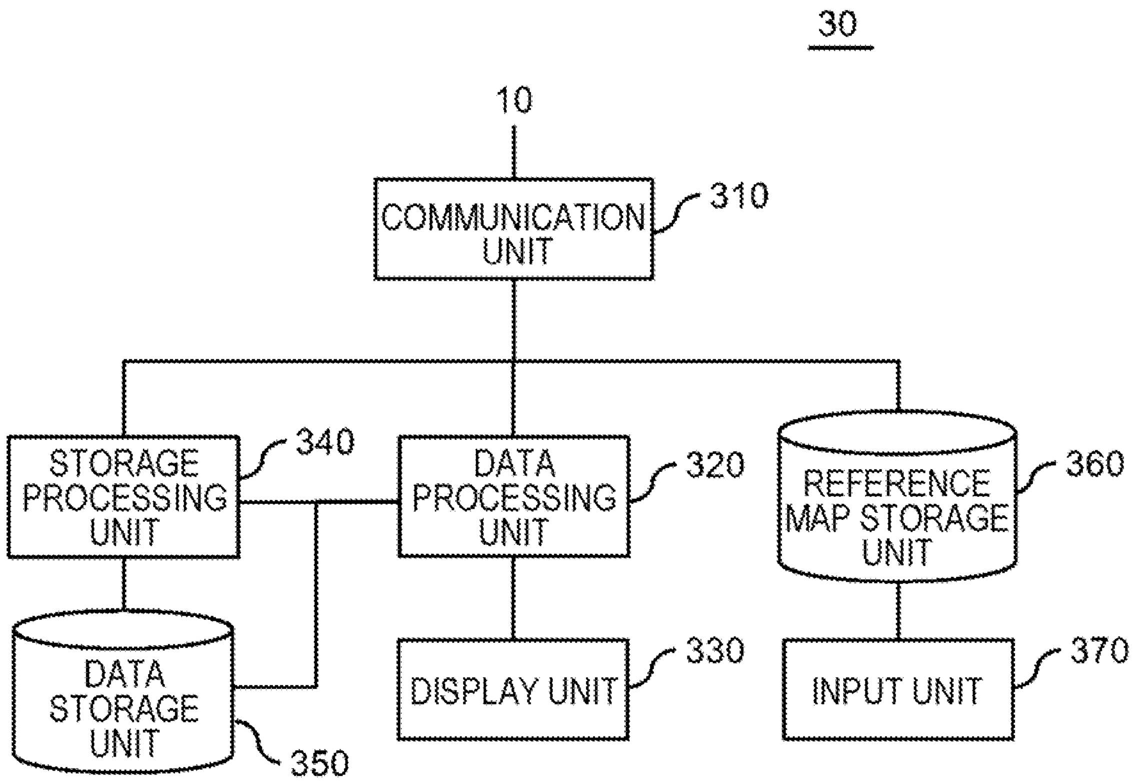
FIG. 5 It is a diagram illustrating one example of a functional configuration of an information processing apparatus.

FIG. 5 is a diagram illustrating one example of a functional configuration of the information processing apparatus 30. In the example illustrated in the present drawing, the information processing apparatus 30 includes a communication unit 310, a data processing unit 320, a display unit 330, a storage processing unit 340, a data storage unit 350, a reference map storage unit 360, and an input unit 370.

The communication unit 310 communicates with the flying body 10. For example, the communication unit 310 receives measurement data generated by the sensor 110 of the flying body 10, together with position data when the measurement data are generated. In addition, the communication unit 310 transmits the reference map information and the route information to the flying body 10.

The data processing unit 320 processes the measurement data transmitted from the flying body 10. For example, the data processing unit 320 processes the measurement data, and thereby generates three-dimensional shape information of an area measured by the sensor 110. In addition, when the measured area includes a part of the measurement target 40, the data processing unit 320 generates data (hereinafter, referred to as damage data) indicating whether the part is damaged and indicating magnitude of the damage.

As described above, the flying body 10 generates measurement data while flying around the measurement target 40. In addition, the information processing apparatus 30 acquires the measurement data in association with the position data of the flying body 10. Thus, the data processing unit 320 can generate three-dimensional shape information of the entire measurement target 40 by processing a plurality of pieces of the measurement data. Note that, the three-dimensional shape information includes information indicating a damaged part, a type of the damage, and magnitude of the damage as well as a shape. At a time of processing the measurement data, the data processing unit 320 may read out and use data stored in the data storage unit 350.

In addition, the data processing unit 320 causes the display unit 330 to display at least one of: at least a part of the measurement data; and a processing result of the measurement data. For example, while the flying body 10 is in flight, the data processing unit 320 displays the three-dimensional shape information based on the measurement data generated by the flying body 10 up to that time. Thereby, the information processing apparatus 30 enables an operator of the information processing apparatus 30 to recognize a part where the flying body 10 has not flown yet.

The storage processing unit 340 causes the measurement data and the position data transmitted by the communication unit 310, to be stored in association with each other in the data storage unit 350. In addition, the storage processing unit 340 causes data generated by the data processing unit 320 processing the measurement data, to be stored in the data storage unit 350.

The reference map storage unit 360 stores the reference map information. This reference map information may be input to the information processing apparatus 30 via the input unit 370. In this case, the reference map information is generated by using, for example, an apparatus outside the information processing apparatus 30.

In addition, the reference map information may be generated by the information processing apparatus 30. In this case, the flying body 10 flies according to operation from the manual control apparatus 20 and generates measurement data, in order to generate reference map data. Then, the data processing unit 320 processes the measurement data generated by this flight, and thereby generates the reference map information.

In addition, the reference map storage unit 360 also stores route information. This route information is input via the input unit 370, for example. In one example, at a time of generating the route information, the data processing unit 320 reads out three-dimensional shape information of the entire measurement target 40 from the data storage unit 350, and causes the display unit 330 to display the read-out three-dimensional shape information. Then, an operator of the information processing apparatus 30 determines a flight route while viewing the three-dimensional shape information displayed on the display unit 330, and inputs, to the input unit 370, information indicating this flight route. As described above, this three-dimensional shape information also includes information indicating a damaged part in the measurement target 40. Then, the operator determines the flight route in such a way that this part can be properly confirmed. At that time, the operator also determines a pose of the flying body 10 for each position on the flight route. Data indicating this pose are also included in the route information.

Note that, the data processing unit 320 may have a route generation function. In this case, the data processing unit 320 determines a flight route and a pose of the flying body 10 in such a way as to avoid collision with the measurement target 40 and to enables measurement of the damaged part in the measurement target 40. In this processing, the data processing unit 320 may use a model generated by machine learning. In this case, the three-dimensional shape information is input to the model. Then, the route information is output from this model. As described above, the three-dimensional shape information includes the information indicating the damaged part. Thus, the route information output from the model is a flight route in which this part can be set as a base.

In addition, the data processing unit 320 may perform processing similar to that of the reference information acquisition unit 151, the surrounding information acquisition unit 152, and the position determination unit 153 illustrated in FIG. 3. In this case, the storage processing unit 340 may use, as position data to be stored in the data storage unit 350, position data generated by the data processing unit 320.

Figure 6:
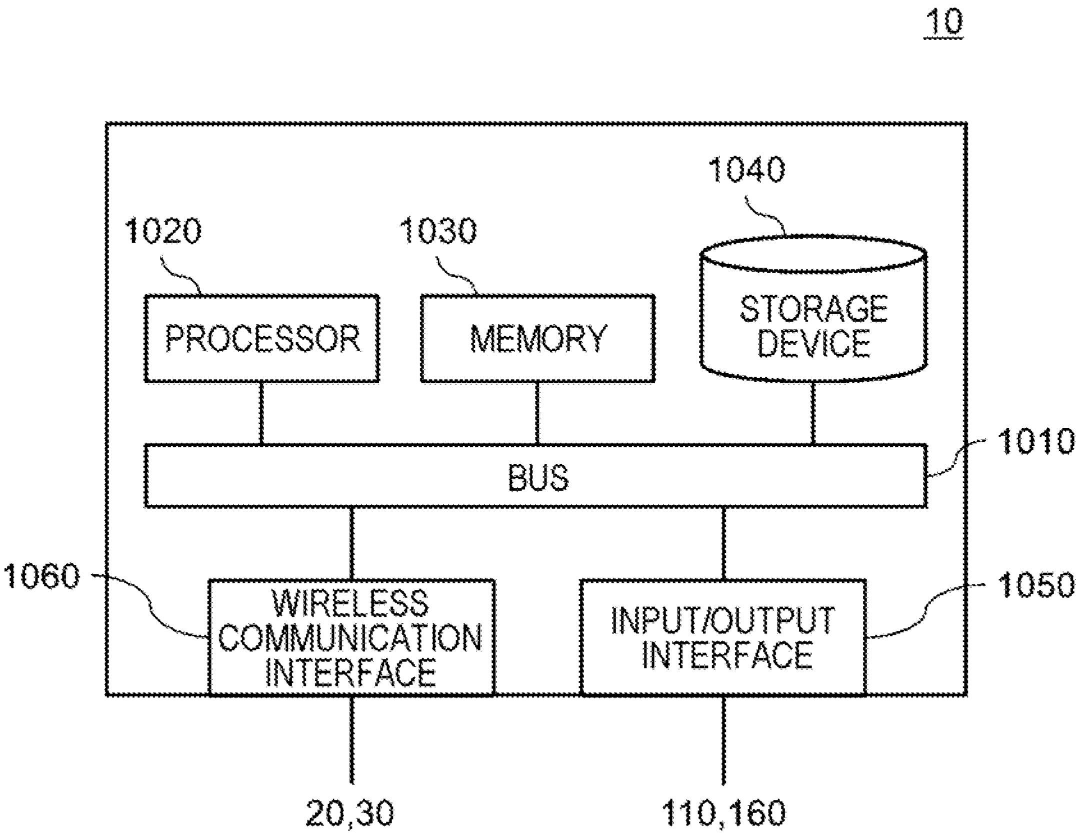
FIG. 6 It is a diagram illustrating a hardware configuration example of a main part of the flying body.

FIG. 6 is a diagram illustrating a hardware configuration example of a main part of the flying body 10. The flying body 10 includes a bus 1010, a processor 1020, a memory 1030, a storage device 1040, an input/output interface 1050, and a wireless communication interface 1060.

The bus 1010 is a data transmission path for the processor 1020, the memory 1030, the storage device 1040, the input/output interface 1050, and the wireless communication interface 1060 to transmit and receive data to and from one another. However, a method of connecting the processor 1020 and the like to one another is not limited to bus connection.

The processor 1020 is a processor implemented by a central processing unit (CPU), a graphics processing unit (GPU), or the like.

The memory 1030 is a main storage apparatus implemented by random access memory (RAM) or the like.

The storage device 1040 is an auxiliary storage apparatus implemented by a hard disk drive (HDD), a solid state drive (SSD), a memory card, a read only memory (ROM), or the like. The storage device 1040 stores a program module that implements each function (e.g., the update unit 130 and the control unit 150) of the flying body 10. The processor 1020 reads each of the program modules onto the memory 1030 and executes the read program module, and thereby, each function associated to the program module is implemented. In addition, the storage device 1040 also functions as the information storage unit 140.

The input/output interface 1050 is an interface for connecting the main part of the flying body 10 and various pieces of input/output equipment with each other. For example, the main part of the flying body 10 communicates with the sensor 110 and the drive unit 160 via the input/output interface 1050.

The wireless communication interface 1060 connects the main part of the flying body 10 to external apparatuses (e.g., the manual control apparatus 20 and the information processing apparatus 30) via wireless communication.

Note that, a hardware configuration of the information processing apparatus 30 is similar to the example illustrated in FIG. 6, except that the input/output interface 1050 is not connected to the sensor 110 and the drive unit 160.

The measurement system illustrated in FIG. 1 performs roughly classified three pieces of processing. First processing is pre-processing for generating the reference map information. Second processing is processing for generating the route information. Third processing is processing for causing the flying body 10 to fly according to the route information. The first processing, the second processing, and the third processing are performed in this order.

Figure 7:
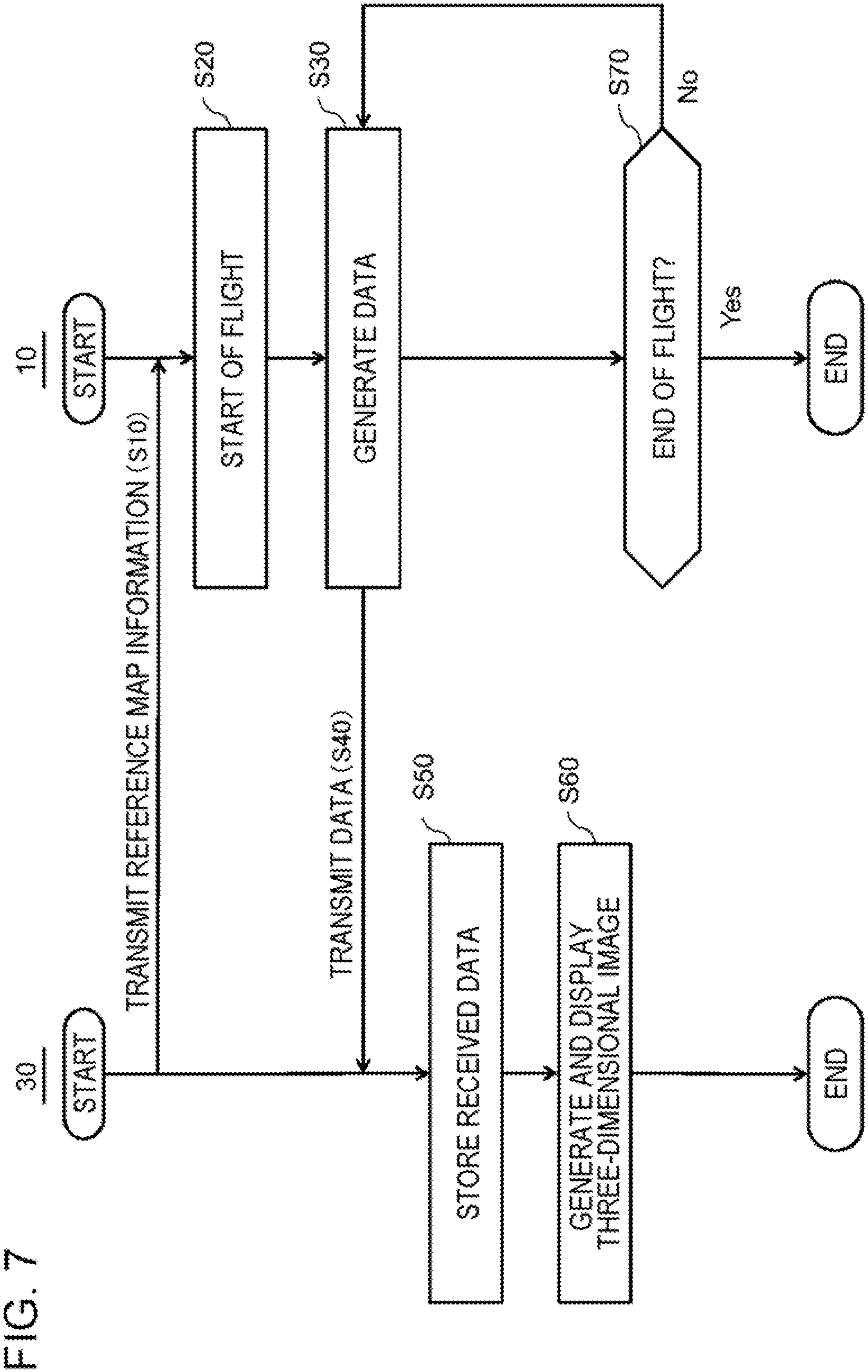
FIG. 7 It is a flowchart illustrating one example of first processing of the measurement system.

FIG. 7 is a flowchart illustrating one example of the first processing described above. In the processing illustrated in the present drawing, the measurement system measures the entire measurement target 40 in order to detect a damaged location in the measurement target 40.

Before the processing illustrated in the present drawing, the reference map information is stored in the reference map storage unit 360 of the information processing apparatus 30. Then, the communication unit 310 of the information processing apparatus 30 transmits the reference map information to the flying body 10 (step S10). The update unit 130 of the flying body 10 stores this reference map information in the information storage unit 140.

Then, an operator of the flying body 10 operates the manual control apparatus 20, thereby causes the flying body 10 to start flight (step S20), and causes the flying body 10 to fly around the measurement target 40. Then, the sensor 110 of the flying body 10 generates measurement data while the flying body 10 is in flight. In addition, the control unit 150 of the flying body 10 generates position data of the flying body 10 (step S30). The position data are based on the coordinate system of the reference map information, as described above. Then, the communication unit 120 of the flying body 10 transmits the generated measurement data and position data to the information processing apparatus 30 (step S40).

The storage processing unit 340 of the information processing apparatus 30 stores, in the data storage unit 350, the measurement data and the position data transmitted from the flying body 10 (step S50). In addition, the data processing unit 320 of the information processing apparatus 30 processes the measurement data and the position data, thereby generates three-dimensional shape information of the measurement target 40, and displays the generated three-dimensional shape information on the display unit 330 (step S60). Herein, only a part in the measurement target 40 that has been measured by the flying body 10 so far is displayed by the display unit 330. Thus, an operator of the flying body 10 or an operator of the information processing apparatus 30 views an image displayed on the display unit 330, and can thereby confirm a part in the measurement target 40 that has not been measured yet by the flying body 10. Then, the operator of the flying body 10 operates the flying body 10 via the manual control apparatus 20 in such a way that this part disappears.

Then, the flying body 10 and the information processing apparatus 30 repeat the processing indicated at the steps S30 to S60 until the flight of the flying body 10 is completed (step S70).

Note that, the reference map information includes three-dimensional shape information of the measurement target 40. Thus, the data processing unit 320 takes a difference between the three-dimensional shape information included in the reference map information and the three-dimensional shape information generated based on the data acquired from the flying body 10, and can thereby determine a part (hereinafter, referred to as an unmeasured part) in the measurement target 40 that has not been measured yet by the sensor 110. In this regard, the data processing unit 320 may cause the display unit 330 to display information for determining the unmeasured part while the flying body 10 is in flight. Thereby, an operator of the flying body 10 can easily recognize the unmeasured part, and thus, can easily decide a flight route of the flying body 10.

Figure 8:
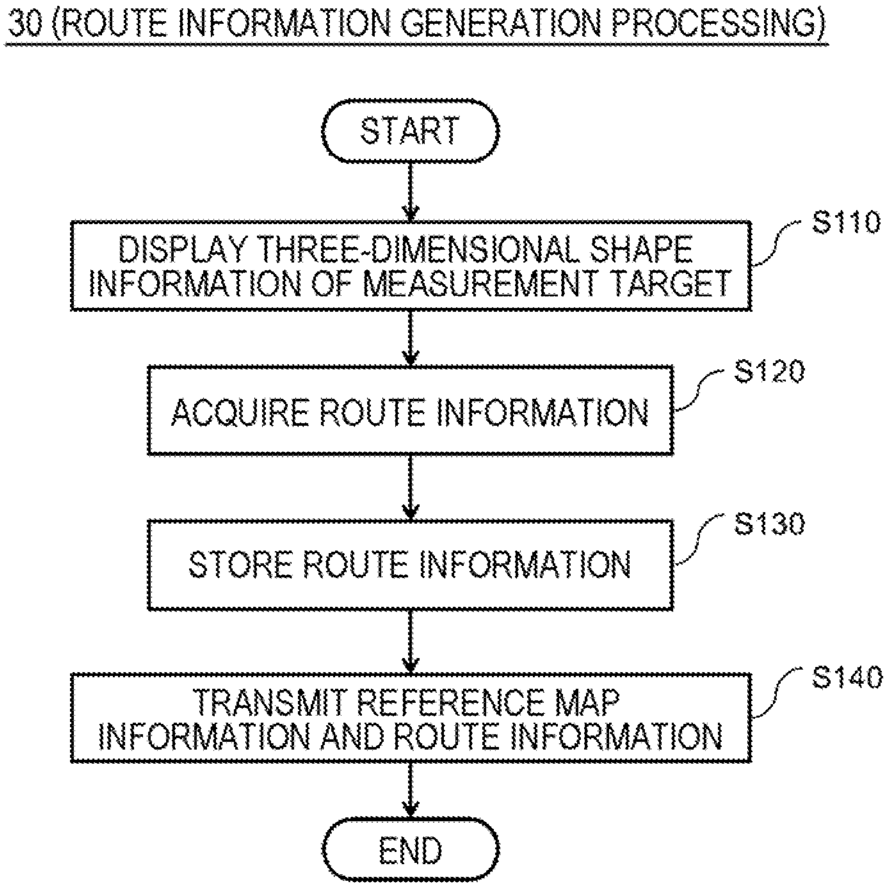
FIG. 8 It is a flowchart illustrating one example of second processing of the measurement system.

FIG. 8 is a flowchart illustrating one example of the second processing described above. First, the data processing unit 320 of the information processing apparatus 30 reads out the information stored in the data storage unit 350, and causes the display unit 330 to display the three-dimensional shape information of the measurement target 40. At this time, the data processing unit 320 causes the display unit 330 to perform display in such a way that a part to be concentratedly confirmed in the measurement target 40, for example, a damaged part, can be recognized (step S110).

An operator of the information processing apparatus 30 decides a flight route of the flying body 10 and a pose to be taken by the flying body 10 at each position on the flight route while viewing the display on the display unit 330, and inputs, to the information processing apparatus 30, as route information, the information indicating the flight route and the pose (step S120). This route information is based on the coordinate system of the reference map information, as described above.

The input unit 370 of the information processing apparatus 30 causes this route information to be stored in the reference map storage unit 360 (step S130). In addition, the communication unit 310 of the information processing apparatus transmits, to the flying body 10, the reference map information and the route information stored in the reference map storage unit 360 (step S140). The update unit 130 of the flying body 10 causes this reference map information and this route information to be stored in the information storage unit 140.

Figure 9:
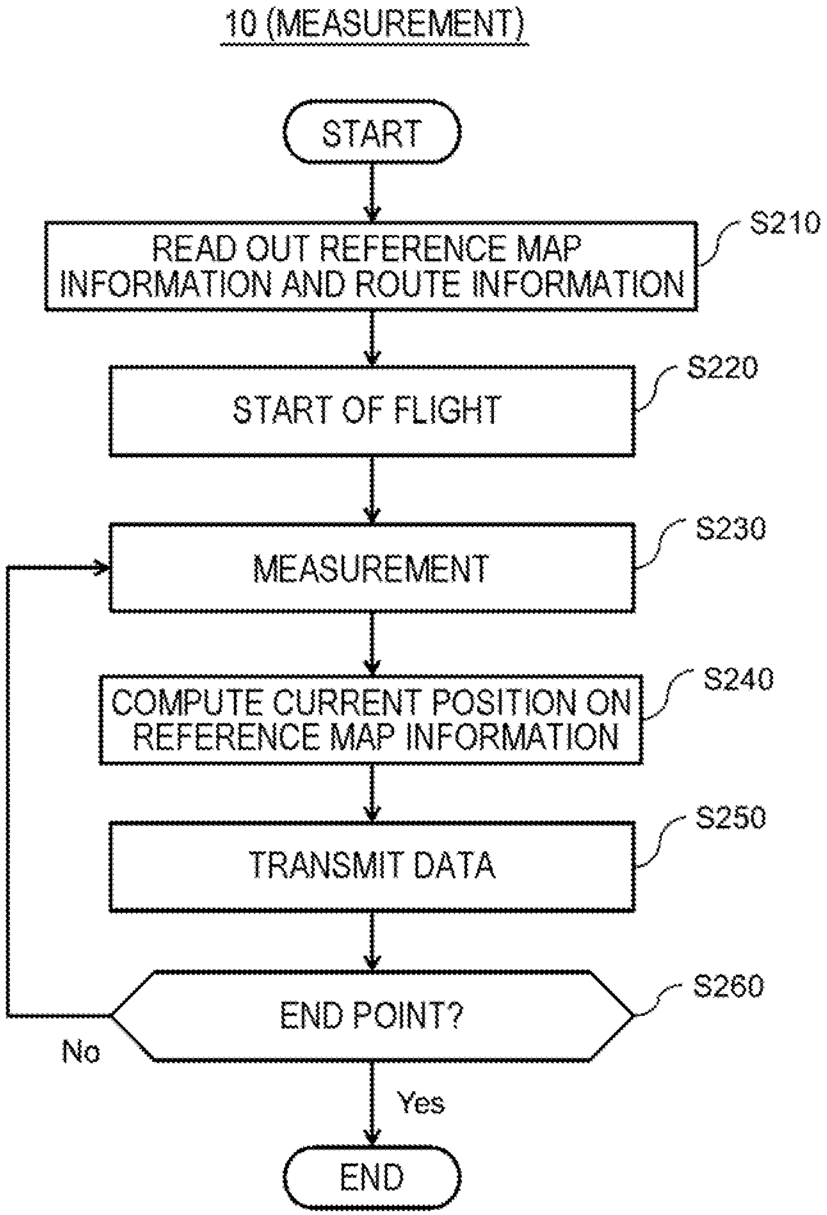
FIG. 9 It is a flowchart illustrating one example of third processing of the measurement system.

FIG. 9 is a flowchart illustrating one example of the third processing described above. In the example illustrated in the present drawing, the flying body 10 performs autonomous flight. First, the control unit 150 of the flying body 10 reads out the reference map information and the route information from the information storage unit 140 (step S210). Then, the control unit 150 controls the drive unit 160, and thereby causes flight of the flying body 10 to be started (step S220). Then, the sensor 110 starts measurement (step S230).

The control unit 150 uses measurement data generated by the sensor 110 and the reference map information, thereby computes a current position of the flying body 10 in the coordinate system of the reference map information, and generates position data (step S240). Then, the communication unit 120 transmits the measurement data and the position data to the information processing apparatus 30. Herein, the communication unit 120 transmits the measurement data to the manual control apparatus 20, depending on necessity (step S250).

The flying body 10 repeats the processing indicated at the steps S230 to S250 until the flying body 10 reaches an end point of the flight route (step S260). In addition, during this period, the control unit 150 controls the drive unit 160 in such a way that a current position of the flying body 10 moves according to the flight route indicated by the route information.

Note that, the processing illustrated in FIG. 9 needs to be repeated periodically in order to recognize deterioration over time in the measurement target 40. At this time, the same information is repeatedly used as the reference map information and the route information. Accordingly, the measurement data generated by the flying body 10 are based on the same coordinate system (i.e., the coordinate system of the reference map information), at any timing.

Therefore, the measurement data of the same part (e.g., a damaged part) in the measurement target 40 can be easily selected from each of pieces of measurement data at mutually different occasions. Thereby, a change (e.g., whether a damage is becoming worse) over time at a specific part in the measurement target 40 can be easily recognized.

Figure 10:
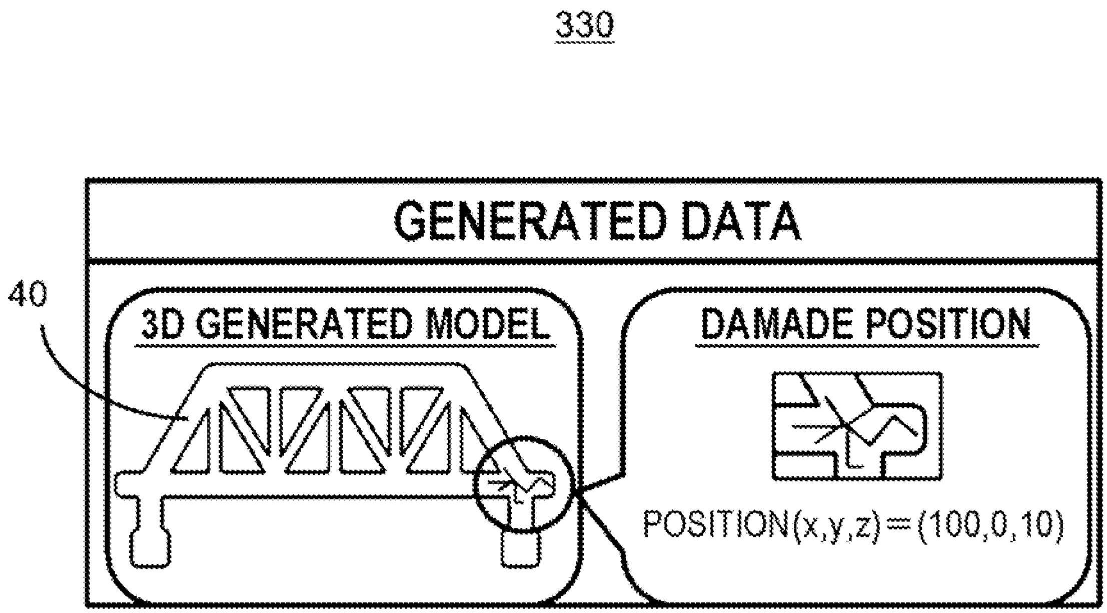
FIG. 10 It illustrates one example of a screen displayed on a display unit of the information processing apparatus.

FIG. 10 illustrates one example of a screen displayed on the display unit 330 of the information processing apparatus 30. For example, at the step S110 in FIG. 8, the data processing unit 320 causes the display unit 330 to display the screen illustrated in the present drawing. However, the data processing unit 320 may cause the display unit 330 to display the screen illustrated in the present drawing, at another timing (e.g., when a management person of the measurement target 40 desires to confirm a damaged part in the measurement target 40). In the screen illustrated in the present drawing, the display unit 330 displays a three-dimensional image (e.g., a three-dimensional image or a three-dimensional computer graphics image) of the measurement target 40, and also displays an image in which a damaged part is enlarged and displayed. At this time, information indicating the damaged part is also displayed in the three-dimensional image. In addition, coordinates of a damage position may be included in the image in which the damaged part is enlarged and displayed.

As described above, according to the present example embodiment, a position of the flying body 10 can be indicated with the coordinate system of the reference map information. Accordingly, a position of the flying body 10 can be determined with high accuracy. In addition, since a GPS does not need to be used, a position of the flying body 10 can be determined with high accuracy even in a place where it is difficult to receive a GPS radio wave, such as a place under a bridge.

In addition, when the processing illustrated in FIG. 9 is repeated periodically, the measurement data of the same part in the measurement target 40 can be easily selected from each of pieces of measurement data at mutually different occasions. Accordingly, a change over time at this part can be easily recognized.

Although the example embodiment of the present invention is described above with reference to the drawings, these described matters are exemplifications of the present invention, and various configurations other than those described above can also be employed.

In addition, in a plurality of the flowcharts used in the above description, a plurality of the steps (pieces of processing) are described in order, but the execution order of the steps executed in each example embodiment is not limited to the described order. In each example embodiment, the order of the illustrated steps can be changed within a range in which inconvenience does not occur in the contents. The above-described each example embodiment can be combined within a range in which contradiction does not occur in the contents.

A part or all of the above-described example embodiment can also be described as in the following supplementary notes, but there is no limitation to the following.

1. A position determination apparatus including:
   - a reference information acquisition unit that acquires reference map information being three-dimensional map information of an area in which a flying body is to be flown;
   - a surrounding information acquisition unit that acquires surrounding information indicating a three-dimensional shape around the flying body; and
   - a position determination unit that determines a three-dimensional position of the flying body in the reference map information by using the reference map information and the surrounding information.
2. The position determination apparatus according to supplementary note 1, further including:
   - a route acquisition unit that acquires route information generated by using the reference map information and indicating a route on which the flying body is to be flown; and
   - a position control unit that moves the flying body along the route information by using a position determined by the position determination unit.
3. The position determination apparatus according to supplementary note 2, in which
   - the route information includes pose information indicating a pose to be taken by the flying body at each position on the route, and
   - the position control unit controls a pose of the flying body by using the pose information.
4. The position determination apparatus according to any one of supplementary notes 1 to 3, wherein
   - the position-measurement determination apparatus is mounted on the flying body, and
   - the flying body includes a sensor,
   - the position determination apparatus further including
     - a communication unit that transmits, to an outside of the flying body, the position determined by the position determination unit and measurement data of the sensor at the position in association with each other.
5. The position determination apparatus according to any one of supplementary notes 1 to 3, in which
   - the flying body includes a sensor,
   - the position determination apparatus further including
   - a storage processing unit that performs processing for storing, in a storage unit, the position determined by the position determination unit in association with measurement data of the sensor at the position.
6. The position determination apparatus according to supplementary note 4 or 5, in which
   - the sensor includes at least one of an image capturing unit and a LIDAR, and
   - the surrounding information is generated by using the measurement data of the sensor.
7. The position determination apparatus according to any one of supplementary notes 1 to 6, in which
   - the route is set in order that the flying body measures a measurement target, and
   - the measurement target is at least one of a bridge, a dam, a building, and a tunnel.
8. An information processing apparatus used together with the position determination apparatus according to any one of supplementary notes 1 to 7, in which
   - the flying body includes a sensor including at least one of an image capturing unit and a LIDAR, and
   - the area includes a measurement target to be measured by the sensor,
   - the information processing apparatus including:
   - a measurement data acquisition unit that acquires, from the position determination apparatus, a position of the flying body in the reference map information and measurement data of the sensor; and
   - a data processing unit that determines, by using a position of the flying body, the measurement data at the position, and the reference map information, an unmeasured part in the measurement target that has not been measured by the sensor, and outputs information indicating the unmeasured part.
9. A position determination method performed by a computer, the position determination method comprising:

reference information acquisition processing of acquiring reference map information being three-dimensional map information of an area in which a flying body is to be flown;

surrounding information acquisition processing of acquiring surrounding information indicating a three-dimensional shape around the flying body; and position determination processing of determining a three-dimensional position of the flying body in the reference map information by using the reference map information and the surrounding information.

10. The position determination method according to supplementary note 9, further including, by the computer:

route acquisition processing of acquiring route information generated by using the reference map information and indicating a route on which the flying body is to be flown; and position control processing of moving the flying body along the route information by using a position determined by the position determination processing.

11. The position determination method according to supplementary note 10, in which the route information includes pose information indicating a pose to be taken by the flying body at each position on the route, and, in the position control processing, by the computer, controlling a pose of the flying body by using the pose information.

12. The position determination method according to any one of supplementary notes 9 to 11, wherein the computer is mounted on the flying body, and the flying body includes a sensor, the position determination method further performing, by the computer, communication processing of transmitting, to an outside of the flying body, the position determined by the position determination processing and measurement data of the sensor at the position in association with each other.

13. The position determination method according to any one of supplementary notes 9 to 11, in which the flying body includes a sensor, the position determination method further including, by the computer, processing for storing, in a storage unit, the position determined by the position determination processing in association with measurement data of the sensor at the position.

14. The position determination method according to supplementary note 12 or 13, in which the sensor includes at least one of an image capturing unit and a LiDAR, and the surrounding information is generated by using the measurement data of the sensor.

15. The position determination method according to any one of supplementary notes 9 to 14, in which the route is set in order that the flying body measures a measurement target, and the measurement target is at least one of a bridge, a dam, a building, and a tunnel.

16. An information processing method performed by a computer used together with the position determination apparatus according to any one of supplementary notes 1 to 7, in which the flying body includes a sensor including at least one of an image capturing unit and a LIDAR, and the area includes a measurement target to be measured by the sensor, the information processing method including, by the computer:

measurement data acquisition processing of acquiring, from the position determination apparatus, a position of the flying body in the reference map information and measurement data of the sensor; and data processing of determining, by using a position of the flying body, the measurement data at the position, and the reference map information, an unmeasured part in the measurement target that has not been measured by the sensor, and outputting information indicating the unmeasured part.

17. A program causing a computer to include:

a reference information acquisition function of acquiring reference map information being three-dimensional map information of an area in which a flying body is to be flown;

a surrounding information acquisition function of acquiring surrounding information indicating a three-dimensional shape around the flying body; and a position determination function of determining a three-dimensional position of the flying body in the reference map information by using the reference map information and the surrounding information.

18. The program according to supplementary note 17, causing the computer to further include:

a route acquisition function of acquiring route information generated by using the reference map information and indicating a route on which the flying body is to be flown;

and a position control function of moving the flying body along the route information by using a position determined by the position determination function.

19. The program according to supplementary note 18, in which the route information includes pose information indicating a pose to be taken by the flying body at each position on the route, and the position control function controls a pose of the flying body by using the pose information.

20. The program according to any one of supplementary notes 17 to 19, wherein the computer is mounted on the flying body, and the flying body includes a sensor, the program causing the computer to further include a communication function of transmitting, to an outside of the flying body, the position determined by the position determination function and measurement data of the sensor at the position in association with each other.

21. The program according to any one of supplementary notes 17 to 19, in which the flying body includes a sensor, the program causing the computer to further include a storage processing function for storing, in a storage unit, the position determined by the position determination function in association with measurement data of the sensor at the position.

22. The program according to supplementary note 20 or 21, in which the sensor includes at least one of an image capturing unit and a LiDAR, and the surrounding information is generated by using the measurement data of the sensor.

23. The program according to any one of supplementary notes 17 to 22, in which the route is set in order that the flying body measures a measurement target, and the measurement target is at least one of a bridge, a dam, a building, and a tunnel.

24. A program executed by a computer used together with the position determination apparatus according to any one of supplementary notes 1 to 7, in which the flying body includes a sensor including at least one of an image capturing unit and a LiDAR, and the area includes a measurement target to be measured by the sensor, the program causing the computer to include:

a measurement data acquisition function of acquiring, from the position determination apparatus, a position of the flying body in the reference map information and measurement data of the sensor; and a data function of determining, by using a position of the flying body, the measurement data at the position, and the reference map information, an unmeasured part in the measurement target that has not been measured by the sensor, and outputting information indicating the unmeasured part.

This application is based upon and claims the benefit of priority from Japanese patent application No. 2021-027553 filed on Feb. 24, 2021, the disclosure of which is incorporated herein in its entirety by reference.

10 Flying body
20 Manual control apparatus
30 Information processing apparatus
110 Sensor
111 Image capturing unit
112 LiDAR
113 Inertial measurement unit
120 Communication unit
130 Update unit
140 Information storage unit
150 Control unit
151 Reference information acquisition unit
152 Surrounding information acquisition unit
153 Position determination unit
154 Route acquisition unit
155 Position control unit
160 Drive unit
210 Input unit
220 Control signal generation unit
230 Communication unit
240 Display unit
310 Communication unit
320 Data processing unit
330 Display unit
340 Storage processing unit
350 Data processing storage unit
360 Reference map storage unit
370 Input unit

What is claimed is:

1. A position determination apparatus comprising:

at least one memory configured to store instructions; and at least one processor configured to execute the instructions to perform operations, the operations comprising:

acquiring reference map information being three-dimensional map information of an area in which a flying body is to be flown;

acquiring surrounding information indicating a three-dimensional shape identified by measuring surroundings of the flying body;

determining a three-dimensional position of the flying body in the reference map information by matching a reference shape included in the reference map information and the three-dimensional shape indicated by the surrounding information;

acquiring route information generated by using the reference map information and indicating a route on which the flying body is to be flown; and moving the flying body along the route information by using the three-dimensional position of the flying body, wherein the route information includes pose information indicating a specific pose to be taken by the flying body at each position on the route, and wherein the operations further comprise:

computing what three-dimensional shape is acquired when viewing from which point in which direction in the coordinate system of the reference map information;

determining a current pose of the flying body at a current position based on the computing of a point and a direction at which a computed three-dimensional shape closest to the three-dimensional shape indicated by the surrounding information is acquired; and controlling a pose of the flying body at each position on the route in such a way as to become the specific pose indicated by the pose information so that a measurement range of a sensor mounted on the flying body includes a measurement target.

2. The position determination apparatus according to claim 1, wherein the position determination apparatus is mounted on the flying body, and wherein the operations further comprise transmitting, to an outside of the flying body, the three-dimensional position of the flying body and measurement data of the sensor at the three-dimensional position, in association with each other.

3. The position determination apparatus according to claim 1, wherein the operations further comprise storing, in a storage, the three-dimensional position of the flying body in association with measurement data of the sensor at the position.

4. The position determination apparatus according to claim 1, wherein the sensor includes at least one of an image sensor and a LiDAR, and wherein the surrounding information is generated by using measurement data of the sensor.

5. The position determination apparatus according to claim 1, wherein the route is set in order that the flying body measures the measurement target, and wherein the measurement target is at least one of a bridge, a dam, a building, and a tunnel.

6. A position determination method performed by a computer, the position determination method comprising:

reference information acquisition processing comprising acquiring reference map information being three-dimensional map information of an area in which a flying body is to be flown;

surrounding information acquisition processing comprising acquiring surrounding information indicating a three-dimensional shape identified by measuring surroundings of the flying body;

position determination processing comprising determining a three-dimensional position of the flying body in the reference map information by matching a reference shape included in the reference map information and the three-dimensional shape indicated by the surrounding information;

route acquisition processing comprising acquiring route information generated by using the reference map information and indicating a route on which the flying body is to be flown; and position control processing comprising moving the flying body along the route information by using a position determined by the position determination processing, wherein the route information includes pose information indicating a specific pose to be taken by the flying body at each position on the route, and wherein the position control processing comprises, by the computer:

computing what three-dimensional shape is acquired when viewing from which point in which direction in a coordinate system of the reference map information;

determining a current pose of the flying body at a current position based on the computing of a point and a direction at which a computed three-dimensional shape closest to the three-dimensional shape indicated by the surrounding information is acquired; and controlling a pose of the flying body at each position on the route in such a way as to become the specific pose indicated by the pose information so that a measurement range of a sensor mounted on the flying body includes a measurement target.

7. The position determination method according to claim 6, wherein the computer is mounted on the flying body, and wherein the position determination method further comprises, by the computer, communication processing comprising transmitting, to an outside of the flying body, the three-dimensional position of the flying body determined by the position determination processing and measurement data of the sensor at the three-dimensional position in association with each other.

8. The position determination method according to claim 6, wherein the position determination method further comprises, by the computer, processing comprising storing, in a storage, the position determined by the position determination processing in association with measurement data of the sensor at the position.

9. The position determination method according to claim 6, wherein the sensor includes at least one of an image sensor and a LiDAR, and wherein the surrounding information is generated by using measurement data of the sensor.

10. The position determination method according to claim 6, wherein the route is set in order that the flying body measures the measurement target, and wherein the measurement target is at least one of a bridge, a dam, a building, and a tunnel.

11. A non-transitory computer-readable medium storing a program for causing a computer to perform operations, the operations comprising:

acquiring reference map information being three-dimensional map information of an area in which a flying body is to be flown;

acquiring surrounding information indicating a three-dimensional shape identified by measuring surroundings of the flying body;

determining a three-dimensional position of the flying body in the reference map information by matching a reference shape included in the reference map information and the three-dimensional shape indicated by the surrounding information;

acquiring route information generated by using the reference map information and indicating a route on which the flying body is to be flown; and moving the flying body along the route information by using the three-dimensional position of the flying body, wherein the route information includes pose information indicating a specific pose to be taken by the flying body at each position on the route, and wherein the operations further comprise:

computing what three-dimensional shape is acquired when viewing from which point in which direction in a coordinate system of the reference map information;

determining a current pose of the flying body at a current position based on the computing of a point and a direction at which a computed three-dimensional shape closest to the three-dimensional shape indicated by the surrounding information is acquired; and controlling a pose of the flying body at each position on the route in such a way as to become the specific pose indicated by the pose information so that a measurement range of a sensor mounted on the flying body includes a measurement target.

12. The non-transitory computer-readable medium according to claim 11, wherein the computer is mounted on the flying body, and wherein the operations further comprise transmitting, to an outside of the flying body, the three-dimensional position of the flying body and measurement data of the sensor at the three-dimensional position in association with each other.

13. The non-transitory computer-readable medium according to claim 11, wherein the operations further comprise storing, in a storage, the three-dimensional position of the flying body in association with measurement data of the sensor at the position.

14. The non-transitory computer-readable medium according to claim 11, wherein the sensor includes at least one of an image sensor and a LiDAR, and wherein the surrounding information is generated by using measurement data of the sensor.

* * * * *